United States Patent
Alessio et al.

(10) Patent No.: US 12,016,277 B2
(45) Date of Patent: Jun. 25, 2024

(54) SYSTEM AND METHOD FOR CULTIVATING PLANT PRODUCTS

(71) Applicant: ZERO SRL, Pordenone (IT)

(72) Inventors: Andrea Alessio, Pordenone (IT); Daniele Modesto, Pordenone (IT)

(73) Assignee: ZERO SRL, Pordenone (IT)

(*) Notice: Subject to any disclaimer, the term of this patent is extended or adjusted under 35 U.S.C. 154(b) by 126 days.

(21) Appl. No.: 17/779,915

(22) PCT Filed: Sep. 30, 2020

(86) PCT No.: PCT/IB2020/059162
§ 371 (c)(1),
(2) Date: May 25, 2022

(87) PCT Pub. No.: WO2021/105783
PCT Pub. Date: Jun. 3, 2021

(65) Prior Publication Data
US 2022/0386545 A1    Dec. 8, 2022

(30) Foreign Application Priority Data
Nov. 26, 2019 (IT) .................. 102019000022191

(51) Int. Cl.
*A01G 31/04*    (2006.01)
(52) U.S. Cl.
CPC .................. *A01G 31/045* (2013.01)
(58) Field of Classification Search
CPC ........ A01G 31/00; A01G 31/02; A01G 31/04; A01G 31/042; A01G 31/045; A01G 31/047; A01G 31/06; A01G 2031/006
(Continued)

(56) References Cited

U.S. PATENT DOCUMENTS

| 4,166,341 A | 9/1979 | Vestergaard |
| 4,337,986 A * | 7/1982 | Haub ............ F16C 13/04 384/456 |

(Continued)

FOREIGN PATENT DOCUMENTS

| CA | 2518789 A1 * | 3/2006 | ............. A01G 31/02 |
| EP | 1733614 | 12/2006 | |

(Continued)

OTHER PUBLICATIONS

International Search Report and Written Opinion of the International Searching Authority, dated Dec. 23, 2020, in connection with International Application No. PCT/IB2020/059162 (18 pages).

*Primary Examiner* — Tien Q Dinh
*Assistant Examiner* — Erica Michelle Huebner
(74) *Attorney, Agent, or Firm* — KLINTWORTH & ROZENBLAT IP LLP (57) ABSTRACT

The invention concerns a system for cultivating plant products without soil comprising a plurality of shelves for cultivating plant products. The shelves have a reference axis and comprise: a supporting frame, a plurality of cultivation bars which have an approximately rectilinear shape, extend along respective longitudinal axes, and are coupled to the supporting frame so as to be arranged approximately coplanar and alongside one another, and have the respective longitudinal axes parallel to the reference axis and mechanical spacing members, which are interleaved between the adjacent cultivation bars, and are each structured so that the actuation of a mechanical spacing member causes a variation of the distance transverse to the reference axis, between two cultivation bars immediately adjacent to the same member. The invention also concerns a method for cultivating plant products.

15 Claims, 7 Drawing Sheets

(58) Field of Classification Search
USPC .............................................................. 47/56
See application file for complete search history.

(56) References Cited

U.S. PATENT DOCUMENTS

| | | | | |
|---|---|---|---|---|
| 4,476,651 A * | 10/1984 | Drury | .................. | A01G 31/042 |
| | | | | 47/65 |
| 9,249,565 B2 * | 2/2016 | Merrifield | .................. | E04C 3/02 |
| 10,390,504 B2 * | 8/2019 | Dufresne | ................ | B65G 1/026 |
| 2017/0273255 A1 * | 9/2017 | Park | ........................ | A01G 31/02 |

FOREIGN PATENT DOCUMENTS

| | | | | |
|---|---|---|---|---|
| EP | 3254557 | | 12/2017 | |
| FR | 2500720 A1 * | | 9/1982 | |
| GB | 2077082 | | 12/1981 | |
| JP | H03127919 | | 5/1991 | |
| WO | WO-2017000046 A1 * | | 1/2017 | ........... A01G 31/042 |

* cited by examiner

SYSTEM AND METHOD FOR CULTIVATING PLANT PRODUCTS

CROSS-REFERENCE TO RELATED APPLICATIONS

This patent application claims priority from Italian patent application no. 102019000022191 filed on Nov. 11, 2019, the entire disclosure of which is incorporated herein by reference.

TECHNICAL FIELD

The present invention relates to a system for cultivating plant products without soil and to the operating method thereof.

In particular, the present invention relates to cultivation shelves that can be used in a system for cultivating plant products without soil, preferably a vertical structure cultivation system (Vertical Farm System), in which the cultivation shelves are each provided with sowing and growth bars and with spacing members, which are structured to conveniently adjust/vary the transverse distance between the sowing and growth bars on the basis of the required cultivation distance between the plant products grown on the bars themselves.

BACKGROUND ART

Generally, soil-less Vertical Farm Systems comprise horizontal cultivation shelves, which are arranged one above the other over several levels (multi-layers, multi-level) and are structured to house the seeds in the sowing step and then to grow the plant products in the cultivation step, after sowing. A cultivation system is described for example in JP H03 127919 A.

In the sowing step, the seeds are arranged on the cultivation shelf at close distances, i.e. at minimum distances, so as to have a maximum sowing density (number of seeds/$m^2$). Following germination, the plant products grow and increase in size, progressively occupying the space that surrounds them. Consequently, to ensure a correct cultivation and to have a certain plant homogeneity on the shelf, it is necessary, during cultivation, to increase the distances between the plant products in order to reduce the density thereof.

For this purpose, the cultivation methods implemented by means of the aforementioned cultivation systems comprise, among the different steps, also the execution of transfer operations, in which the plant products provided in a cultivation shelf, when reaching a pre-established maximum plant size, are divided and transplanted (stably planted) into several shelves so as to be able to increase the mutual distances on each shelf that houses them and, at the same time, to reduce the density thereof on the shelf.

The aforementioned transplant operations, generally referred to as "repatching operations", are commonly carried out manually and are therefore subject to relatively long execution times, which have a significant impact on the overall production costs. These operations are also disadvantageous since, in addition to increasing the risk of contamination of plant products by operators, they can cause damage, thus determining an increase in waste and therefore in production costs.

The aforementioned drawbacks represent relatively important criticalities in soil-less Vertical Farm Systems given that, among the objectives set by producers who use "vertical farms", there are on the one hand, the reduction of production costs and on the other, the reduction in the use of pesticides and phytochemicals. The technical problems deriving from the transplant operations described above have not been solved in a satisfactory manner to date in order to fully achieve the objectives set by the producers.

DISCLOSURE OF INVENTION

The object of the present invention is therefore to provide a system for cultivating plant products without soil, preferably of the vertical structure type, which allows to overcome the aforesaid technical problems.

This object is achieved by the present invention as it relates to a system for cultivating plant products without soil, and to the operating method thereof, as defined in the corresponding attached claims.

BRIEF DESCRIPTION OF THE DRAWINGS

The present invention will now be described with reference to the attached drawings, which illustrate a non-limiting example of embodiment, wherein:

FIG. 12 is a section of the connection device shown in FIG. 11, FIGS. 13 and 14 are two perspective views of a portion of the shelf made according to the dictates of the present invention, in which the mechanical spacing member is in the first and in the second operating condition, respectively.

BEST MODE FOR CARRYING OUT THE INVENTION

The present invention will now be described in detail with reference to the attached Figures so as to allow a person skilled in the art to make and use it. Various modifications to the embodiments described will be immediately apparent to the persons skilled in the art and the generic principles described can be applied to other embodiments and applications without thereby departing from the scope of the present invention, as defined in the attached claims. Therefore, the present invention should not be considered limited to the embodiments described and illustrated, but should be granted the broadest scope according to the principles and features described and claimed herein.

The present invention is essentially based on the idea of using mechanical spacing members, which are interposed/interleaved between the cultivation bars of a shelf, and are actuated, preferably manually, to mutually space the cultivation bars so as to thus position them at a pre-established distance one from the other.

Figure 1:
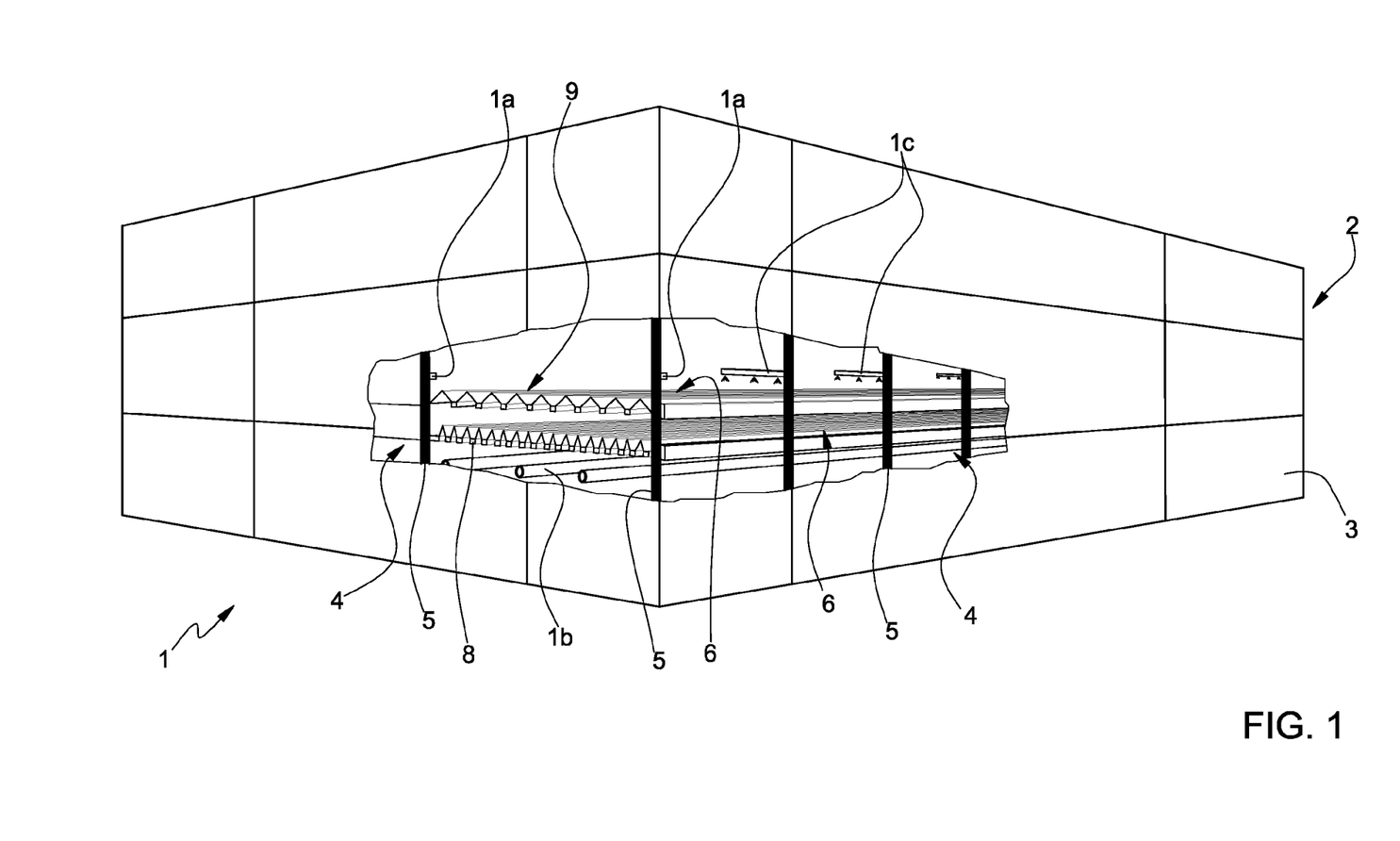
FIG. 1 schematically shows an example of a system for cultivating plant products without soil which is provided with shelves comprising soil-less cultivation bars, obtained according to the dictates of the present invention FIG. 2 schematically shows a cultivation shelf of the system shown in FIG. 1 in a first operating condition, FIG. 3 schematically shows a cultivation shelf of the system shown in FIG. 1 in a second operating condition.

According to a preferred embodiment shown in FIG. 1, number 1 schematically denotes, as a whole, a system for cultivating plant products without soil. In the Figures and in the following disclosure, reference will be made to a system for cultivating plant products without soil of the Vertical Farm System type without however losing generality. In fact, it is understood that the present invention must not be considered limited to a Vertical Farm System which represents a preferred embodiment, but can also be applied to other types of systems for cultivating plant products without soil, such as, for example, systems provided with a traditional greenhouse that uses natural (solar) lighting, rather than artificial lighting.

According to the preferred exemplary embodiment, the system 1 can comprise at least one cultivation module 2, which internally delimits an artificial cultivation environment for the intensive growth of plant products in controlled environmental conditions. The cultivation module 2 can comprise, for example, an external cultivation casing/container 3, which internally delimits/contains the aforementioned artificial cultivation environment. The external cultivation container 3 is preferably closed and can have, for example, a conveniently parallelepiped shape which internally delimits the artificial cultivation space/environment.

It is understood that in the following discussion by the term "soil-less" we mean a system that involves the cultivation of plant products without the use of supporting layers/substrates able to support the roots that are formed by soil/topsoil, and/or tissue and/or inorganic granular compounds, or the like.

It is also understood that by the term "artificial cultivation environment" we mean a soil-less or above-ground production area/space (growing area) within which the cultivation method is implemented.

It is also understood that by the term "plant product", according to the present invention, we preferably mean any plant product for food use, such as, for example, salads, vegetables, plants, aromatic herbs (for example basil, mint), or the like.

However, it is understood that the aforementioned invention is not limited to plant products for food use of the type mentioned above by way of example, but can be applied in addition and/or alternatively for cultivating other types of plant products which (unlike the present invention wherein no type of support layer is used) are generally grown in traditional "with-soil" greenhouses, such as for example flowers, plants or the like.

With reference to FIG. 1, the system 1 further comprises a plurality of cultivation structures 4. The cultivation structures 4 are preferably arranged inside the cultivation container 3. The cultivation structures 4 comprise a plurality of cultivation shelves 6 on which both the sowing and the cultivation (growth) of the plant products are carried out, and frames 5 structured to support the cultivation shelves 6.

In the preferred embodiment, the cultivation structures 4 have a vertical structure in which the cultivation shelves 6 are arranged on the frames 5 so as to form a plurality of cultivation planes which are arranged on several levels, spaced apart one above the other. A one-level cultivation plane can comprise a series of cultivation shelves 6 arranged horizontally, alongside one another.

It should be noted that according to an alternative embodiment, the system 1 can have a structure different from that shown in FIG. 1, such as, for example, a horizontal development type structure wherein only one single level is provided (not the multilevel) in which the shelves are coplanar to one another and are preferably arranged alongside one another.

With reference to FIGS. 2-7, the shelves 6 each have a reference axis A and comprise a supporting frame 7 and a plurality of cultivation rods or bars 8 arranged on the supporting frame 7. The cultivation bars 8 are provided with seats 20 designed to house the seeds for cultivating plant products. The cultivation bars 8 have an approximately rectilinear shape and extend along respective longitudinal axes B.

The cultivation bars 8 are coupled to the supporting frame 7 of the shelf 6 so as to be arranged approximately coplanar and alongside, one with respect to the other, so as to have the respective longitudinal axes B parallel to the reference axis A.

With reference to FIGS. 2-7, the shelves 6 comprise, furthermore, mechanical spacing members 9, which are interposed/interleaved between the cultivation bars 8, and are each structured so that the actuation thereof causes a variation of the distance between a cultivation bar 8 and the immediately adjacent cultivation bar 8, along a direction R transverse to the reference axis A, and to the longitudinal axes B.

Figure 2:
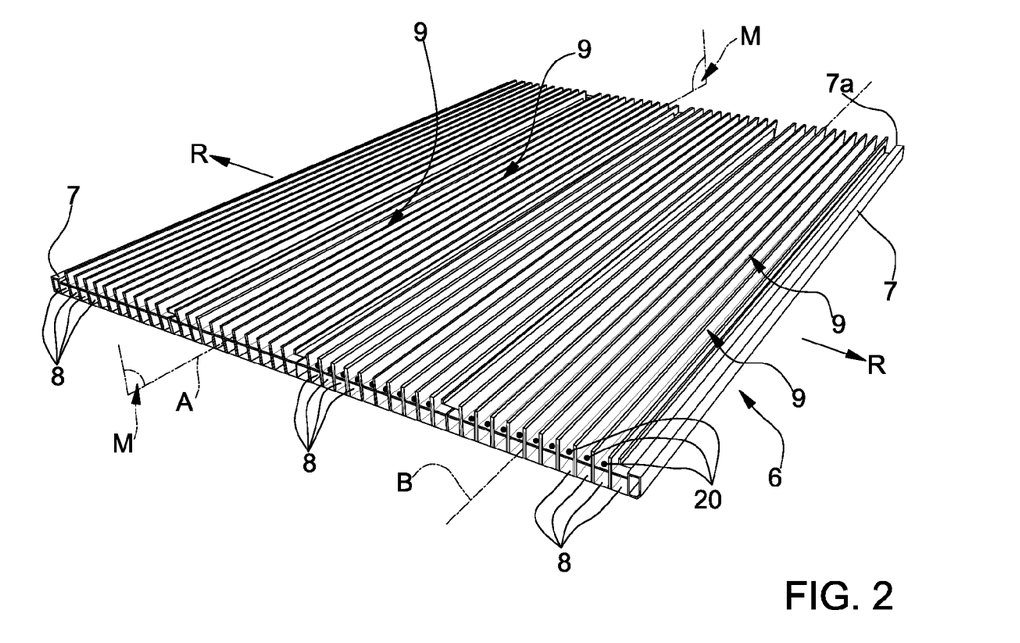
Figure 3:
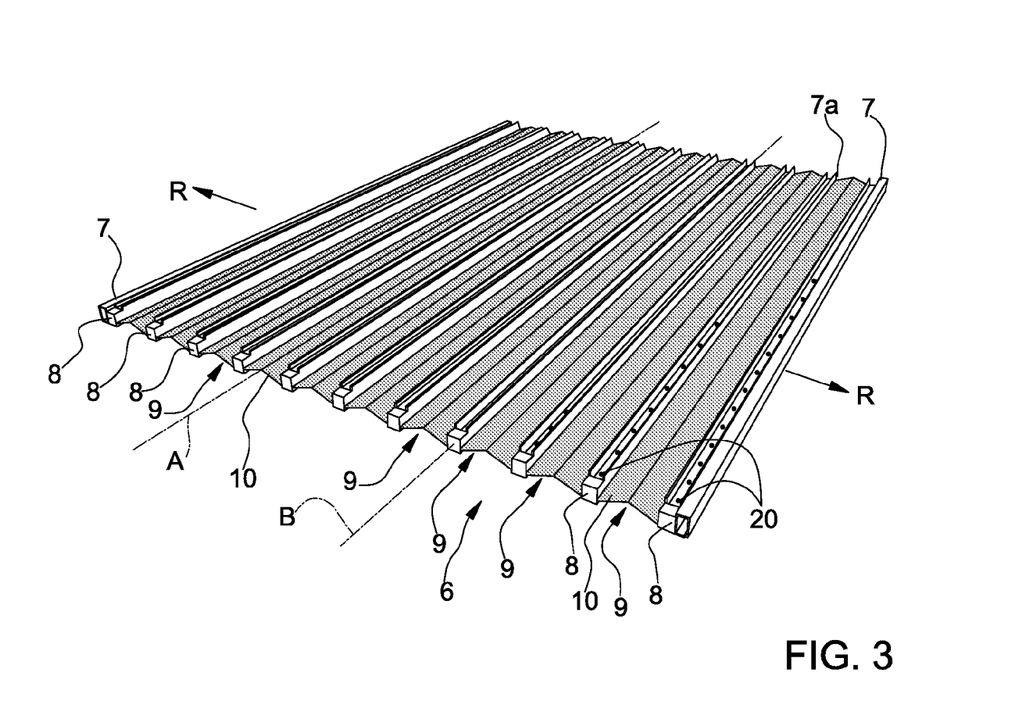
Figure 4:
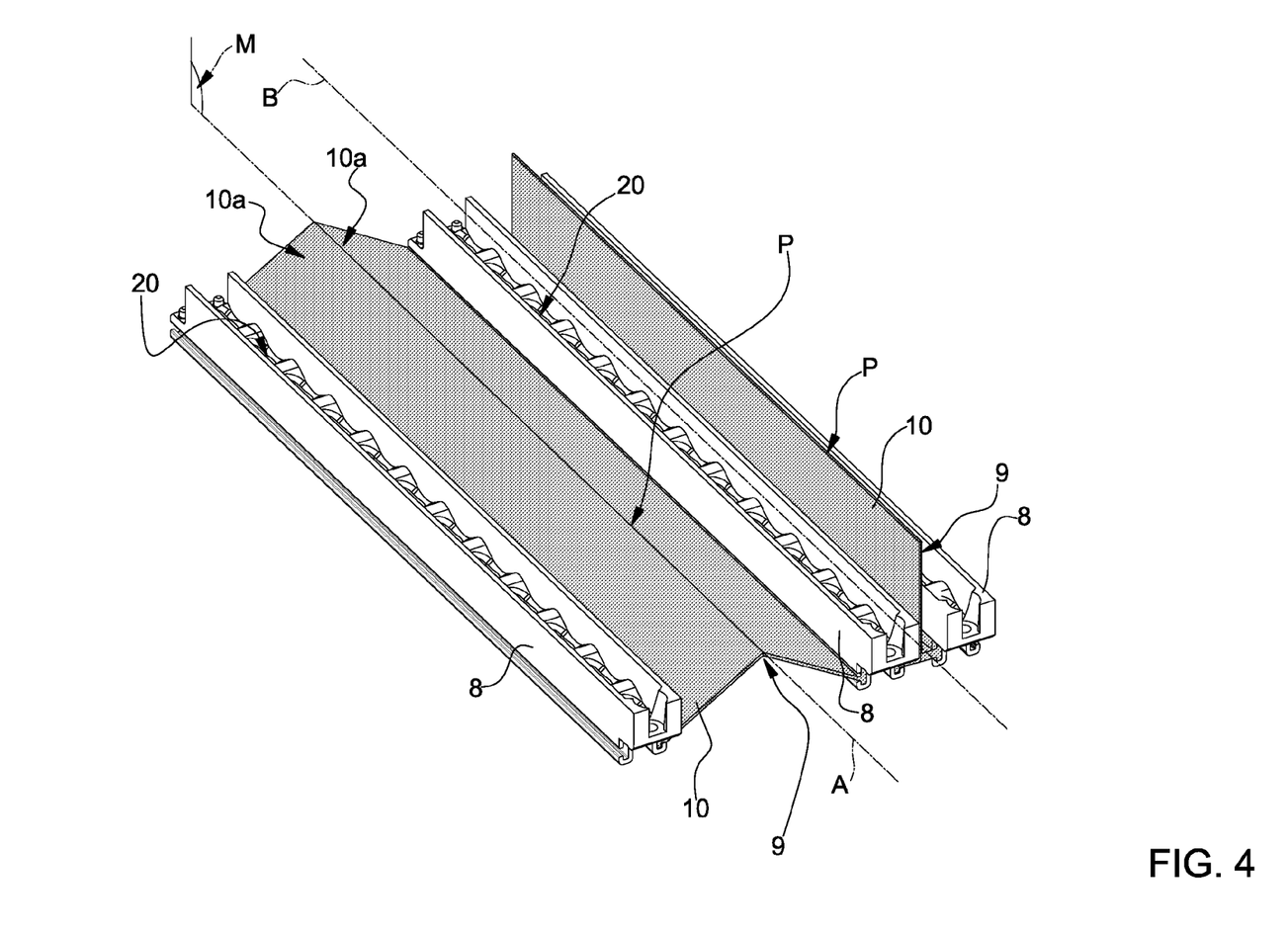
FIG. 4 is a perspective view of a portion of the shelf of the system obtained according to the dictates of the present invention.
Figure 5:
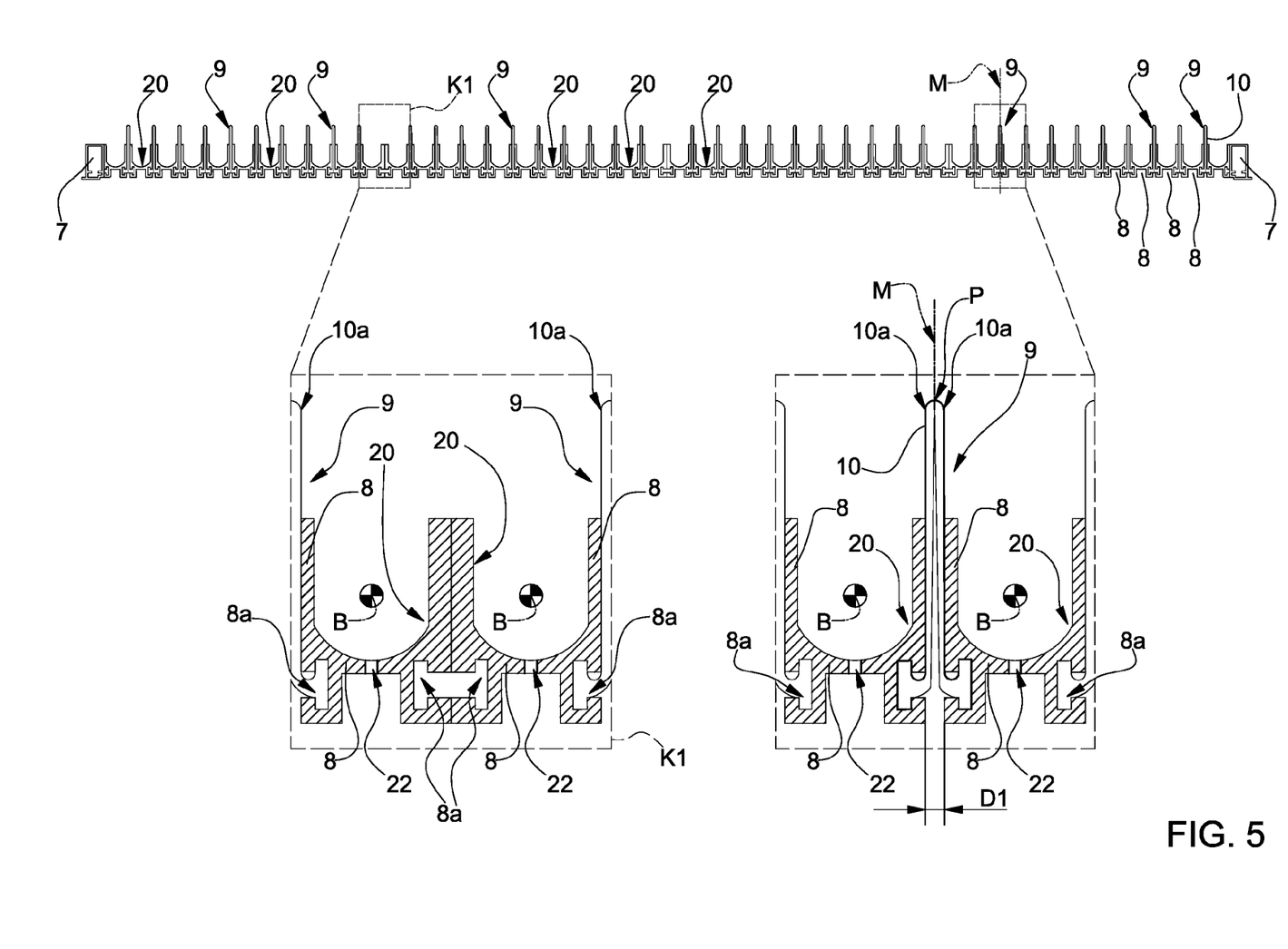
FIG. 5 is a cross-section, with parts on an enlarged scale, of a cultivation shelf of the system in a first operating condition.
Figure 6:
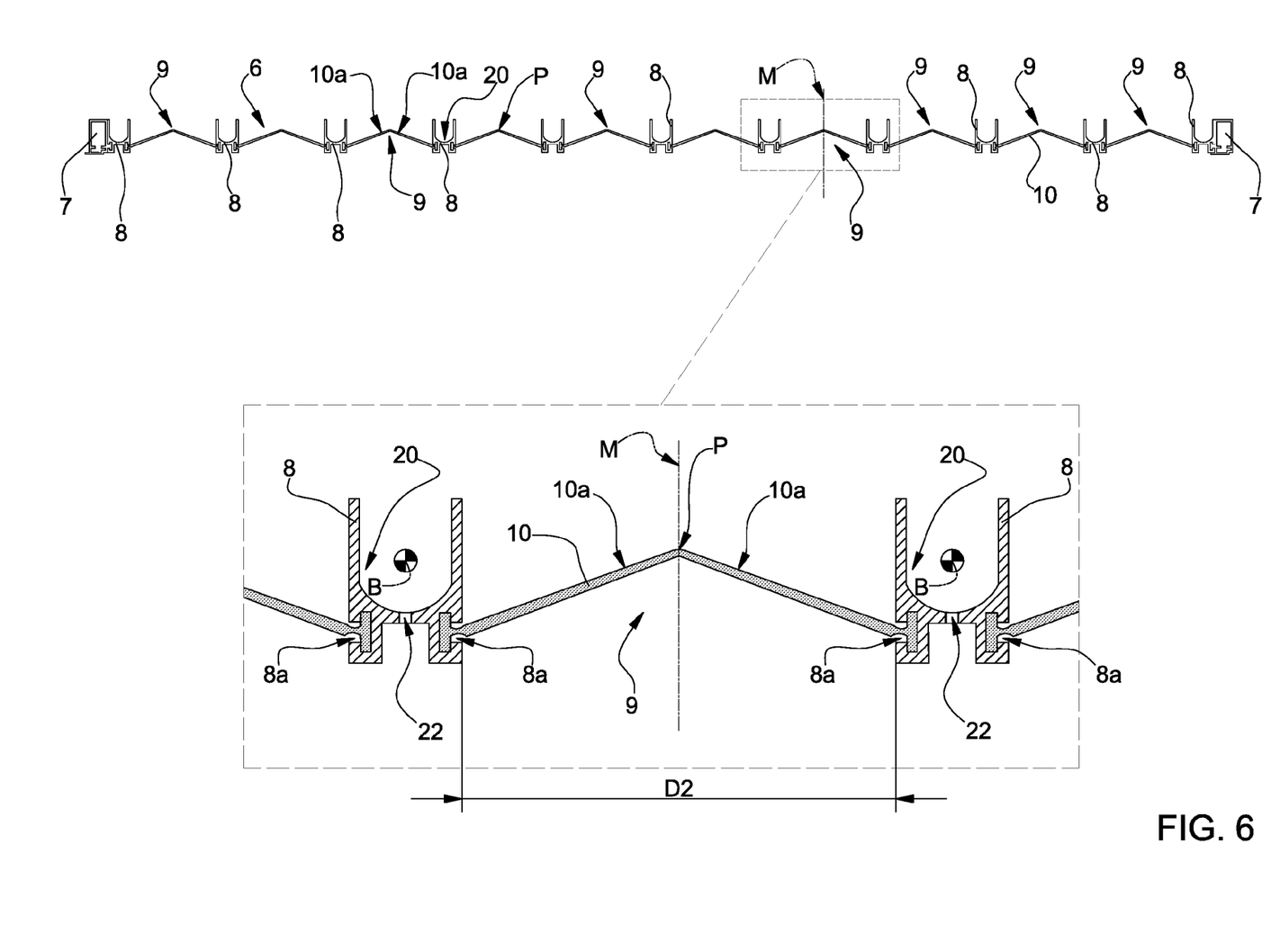
FIG. 6 is a cross-section, with parts on an enlarged scale, of a cultivation shelf of the system in a second operating condition.

With reference to the example illustrated in FIGS. 2 and 3, the mechanical spacing members 9 are structured so as to be operated between a first operating condition, in which the mechanical spacing member 9 arranges the two cultivation bars 8 connected thereto at a first pre-established distance D1 one with respect to the other (by keeping them parallel to the reference axis A) (FIGS. 2 and 5), and a second operating condition in which the two cultivation bars 8 are arranged at a second pre-established distance D2 different from the first distance D1 (keeping them parallel to the axis A) (FIGS. 3 and 6).

According to a preferred embodiment shown in FIGS. 2-7, the mechanical spacing member 9 comprises a rectangular bellows-structured sheet 10, foldable along a folding line P, which extends parallel to the longitudinal axis B of the bars 8 and is approximately defined by the intersection of the rectangular sheet 10 and the (vertical) centre-line plane M thereof.

The folding line P, made on the sheet 10, delimits two rectangular side edges 10a which, in the first operating position in which the sheet 10 is completely folded on itself like a book (FIGS. 2, 5 and 13), are arranged approximately parallel to the centre-line plane M and face one another so that the bars 8 connected to the same are approximately close to one another at the first distance D1.

Starting from the first operating condition (FIGS. 2, 5 and 13), the foldable sheet 10 is opened by spreading the two edges 10a. The spreading of the edges 10a moves the two bars 8 connected to the same, moving them away and spacing them one from the other until reaching, at the end of the opening movement of the edges 10a of the sheet 10, the second distance D2 in which the bars 8 are still parallel one with respect to the other (FIGS. 3, 6 and 14).

Figure 7:
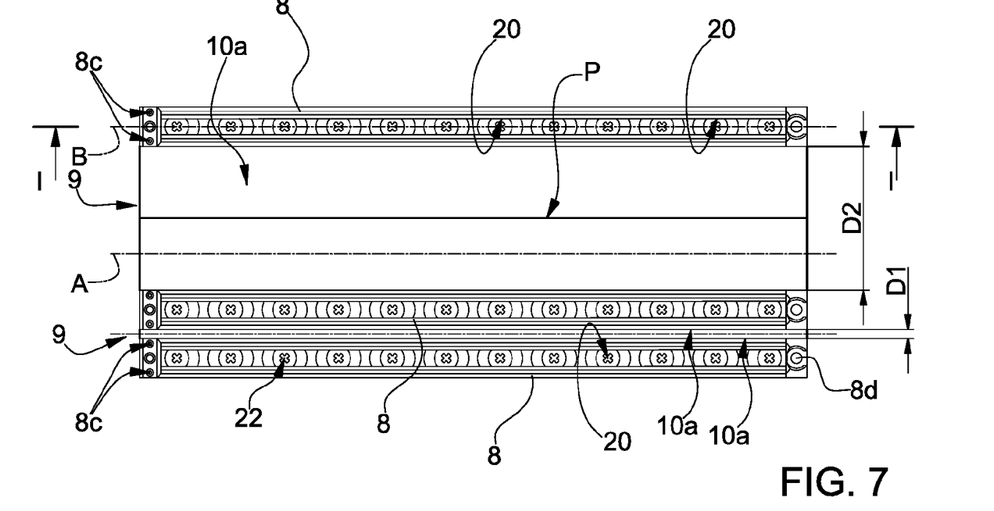
FIG. 7 is a top view of a portion of the shelf of the system made according to the dictates of the present invention.

With reference to the preferred embodiment shown in FIGS. 2, 4, 5 and 7, the first distance D1 between the adjacent bars 8 can approximately correspond to the overall thickness of the two edges 10a set vertically alongside one another. The second distance D2 can instead correspond approximately to the width of the extended sheet 10, measured transversely to the folding line P (FIGS. 6 and 7).

It is understood that the width of the sheet 10, and therefore the second distance D2, depends on the space required around the plant product in the second operating condition and/or on the dimensions of the shelf 6 which receives the bars 8. In other words, the widths of the sheets 10 can be sized on the basis of the pre-established space required for the growth of the plant product.

According to a possible embodiment, the width of the sheet 10 can be greater than the width of the bar 8 measured transversely to the longitudinal axis B. For example, the width of the sheet 10 can be a multiple of the width of the bar 8. Preferably, the spacing members 9 of a cultivation shelf 6 can be coupled to the bars 8 so as to form at least two groups of distinct bars separated from one another (FIG. 5).

In other words, a pair of adjacent bars 8 comprised between the bars 8 forming the shelf 6, for example the two bars 8 arranged centrally in the shelf 6, can be completely separated, i.e. not connected to one another by means of a spacing member 9, as shown in the enlarged portion K1 in FIG. 5.

In this case, each group of bars 8 can therefore occupy, when the respective mechanical spacing members 9 are in the first operating position, at least half of the overall width of the shelf 6 while, when the respective mechanical spacing members 9 are in the second operating position (open/spread) the group of bars 8 can occupy the entire width of a shelf 6. The Applicant has found that the use of the mechanical spacing members 9 between the adjacent bars 8 has the technical effect of allowing the operator to modulate at will the distance between the plant products present on the shelf 6, at least between the first and second operating positions, by carrying out a simple and quick manual operation.

With reference to the preferred embodiment shown in FIGS. 5 and 6, the mechanical spacing member 9 is structured to be coupled in a stable yet easily removable (separable) manner to the two adjacent bars 8 to be spaced apart/drawn near.

According to an exemplary embodiment, the lateral ends of the edges 10a, i.e. the free edges parallel to the folding line P, are shaped so as to be engaged in respective slots 8a which are formed on the (vertical) side walls of the bars 8 and extend in a rectilinear manner parallel to the axis B. Preferably, the free border of the edge 10a can have an enlarged portion which axially engages the slot 8a so as to slide in the same along a direction parallel to the axis B.

The slot 8a can be shaped so as to prevent the extraction of the same from the enlarged portion of the edge 10a along a direction transverse to the axis B. In other words, the enlarged portion of the edge 10a can be manually inserted/fitted into the slot 8a and made to progressively slide axially along the same so that the sheet 10 can reach a longitudinal position in which it is arranged between the two bars 8. The enlarged portions of the sheet 10 and the slots 8a are, therefore, shaped and sized to keep the sheet 10 trapped and thus avoid the extraction thereof along the direction transverse to the axis B.

According to an embodiment shown in FIGS. 8-12, the shelves 6 comprise connection devices 11, which are designed to couple the bars 8 to the supporting frame 7 in a stable yet removable manner. Preferably, the two opposite distal ends of each bar 8 can be coupled to the supporting frame 7 by means of respective connection devices 11. Each connection device 11 is structured so as to be mechanically coupled onto the distal end of the bar 8 to form a closure plug of the end thereof. The connection device 11 is also structured so as to be snap-fitted onto the supporting frame 7.

In the example illustrated in FIGS. 9-12, the connection device 11 has a coupling portion 11a having an approximately C-shaped section (FIGS. 10 and 12) to snap-engage on a profile 7a which forms one of the sides of the supporting frame 7 and is orthogonal to the reference axis A.

The coupling portion 11a is furthermore structured so as to prevent the displacement of the bar 8 along a direction transverse to the reference axis A. In other words, the coupling portion 11a is furthermore structured so that it cannot slide along the profile 7a to which it is coupled, but remains stably in the position in which the fitting/engaging took place. It is understood that the present invention is not limited to the use of a connection device 11 provided with a coupling portion 11a of the type described above, but according to a variation of an alternative embodiment, the coupling portion 11a can be shaped/structured so as to slide along the section 7a keeping the respective bar 8 coupled to the same.

In the example illustrated, the connection device 11 has, furthermore, a fixing portion 11b, preferably opposite to the connection coupling portion 11a, which is shaped to connect with one end of the bar 8 (FIGS. 8, 9 and 10) and is designed to close the longitudinal ends of the slots 8a so as to pre-vent the extraction of the edges 10a from the bar 8. The coupling portion 11a can be provided with vertical teeth 11c designed to be engaged in a locking manner in respective seats 8c obtained on the end of the bar 8.

The connection coupling portion 11a of the other connection device 11 arranged on the other end of the bar 8 (FIGS. 8, 11 and 12) can instead be provided with seats 11d designed to receive respective teeth (not shown) present on the end of the bar 8, opposite to the end provided with teeth 11c. The connection portion 11b may also have a through hole 11e coaxial with a through hole 8d obtained on the end of the bar 8 to house a fixing screw (not illustrated) which fixes the connection portion 11b to the bar 8 itself.

The bars 8 are preferably manufactured with a polymeric-based material (plastic material) or the like. The mechanical spacing members 9 are preferably manufactured with a polymeric-based material (plastic material) or the like. The connection devices 11 are preferably manufactured with a polymeric-based material (plastic material) or the like.

With reference to FIG. 1, the cultivation system 1 can comprise, furthermore: a sensor system 1a (partially and schematically illustrated), which is arranged inside the cultivation container 2 and is configured so as to cause/detect the pre-established cultivation parameters associated with the cultivation process implemented.

According to a possible embodiment, the cultivation parameters measured by the sensor system 1a, for example by means of respective sensors, may comprise, for example, one or more of the following parameters: parameters that are indicative of humidity, parameters that are indicative of temperature, parameters that are indicative of carbon dioxide.

The cultivation system 1 can comprise, furthermore, a fertigation system 1b (only schematically and partially illustrated in FIG. 1), which is arranged at least partially inside the cultivation container 3 and is structured to feed, selectively and in a controlled manner in terms of quantity and/or type and/or feeding moments, fertilizer-based substances to cultivated plant products. Preferably, the fertigation system 1b can comprise an aeroponic and/or hydroponic fertigation system provided with respective aeroponic and/or hydroponic devices.

The cultivation system 1 can comprise, furthermore, a lighting system 1c (only schematically and partially illustrated in FIG. 2), which is arranged inside the cultivation container 3. The lighting system 1c can be configured to illuminate in a controlled manner the cultivation environment according to pre-established lighting parameters.

The pre-established lighting parameters can be indicative of the intensity and/or wavelength of the light. The lighting system 1c can comprise electrical lighting sources, for example, LED lighting sources (not illustrated) or similar electrical sources, arranged at the shelves/trays 6, for example above the same, so as to be able to illuminate the growing area below.

Figure 8:
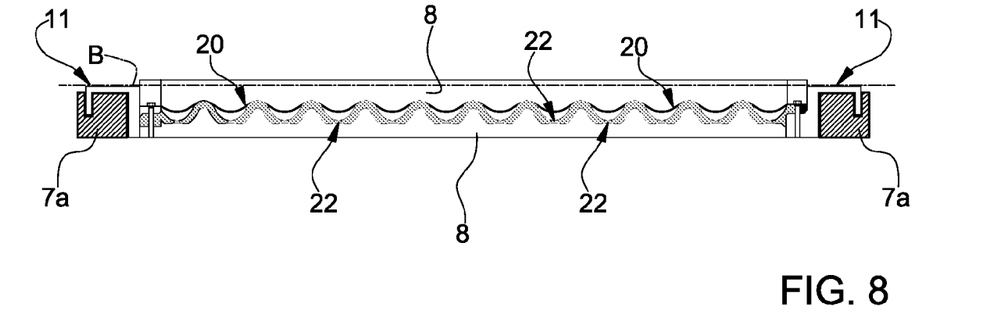
FIG. 8 is a longitudinal section I-I of a bar of the shelf of the system made according to the dictates of the present invention.
Figure 9:
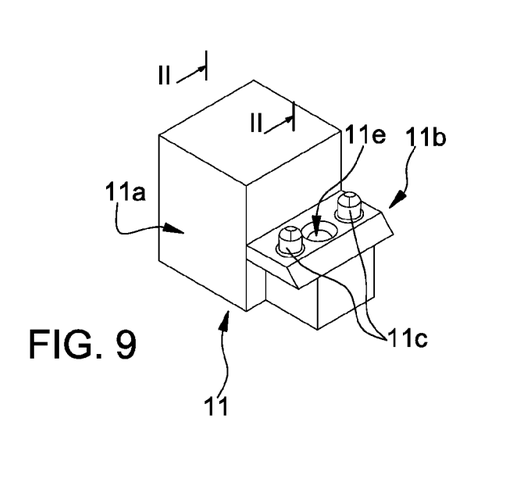
FIG. 9 is a perspective view of a device for connecting the bar of the shelf of the system made according to the dictates of the present invention.
Figure 10:
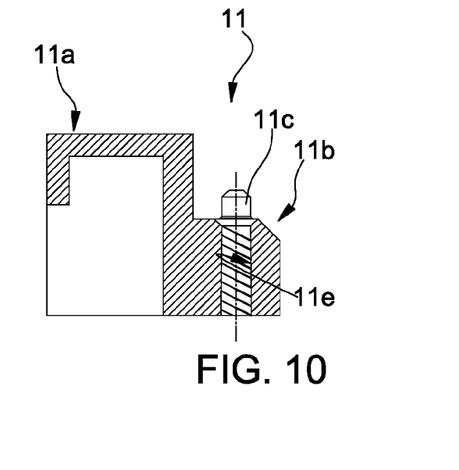
FIG. 10 is a section II-II of the connection device shown in FIG. 9.
Figure 11:
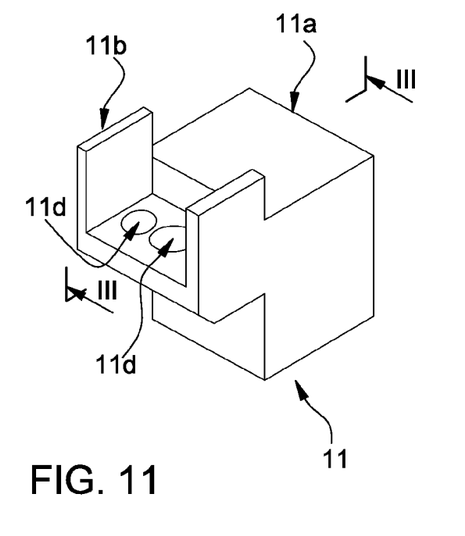
FIG. 11 is a perspective view of another device for connecting the bar of the shelf of the system made according to the dictates of the present invention.
Figure 12:
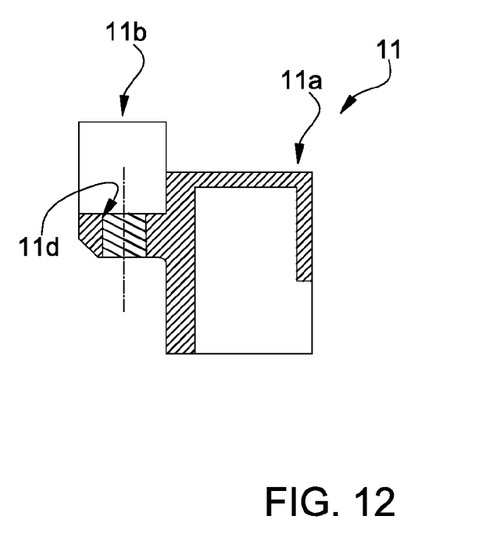
Figure 13:
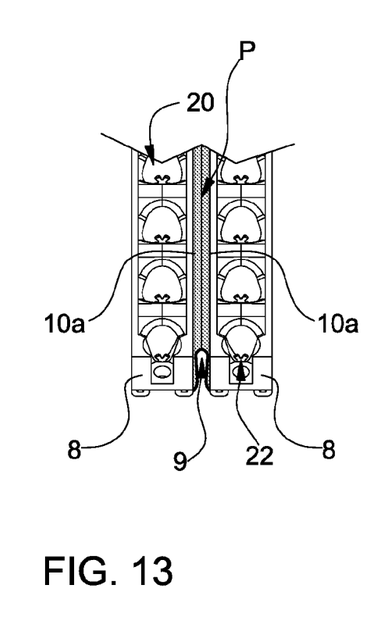
Figure 14:
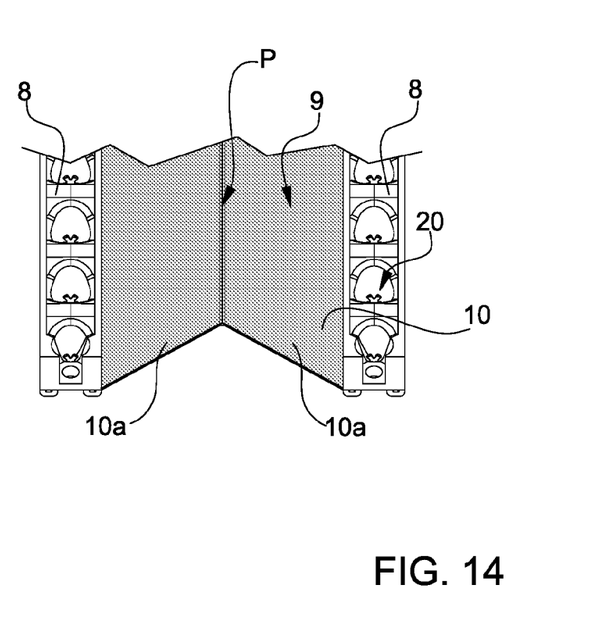

As for the bars 8, they are each provided with seats 20 which, according to an embodiment, can be obtained on the upper surface of the bar 8 and are spaced apart from one another along the longitudinal axis B (FIGS. 7, 8 and 13).

According to a preferred exemplary embodiment, the seats 20 can be formed by recesses or concave niches which have, on the bottom, a through opening 22 structured to be crossed by, and remain in direct contact with, the roots of the plant product during the growth of the same. Preferably, the seats 20 are approximately cup-shaped. Preferably, the seats 20 are arranged approximately equidistant from one another along the axis B.

The internal surface of the seats 20 which houses the seeds (and the roots) is devoid of, i.e. it is not coated with, any support/gripping layer, and does not contain soil or the like. In use, the seeds (not illustrated) are arranged inside the seats 20 so as to be supported by, i.e. in direct contact with the internal surface (made of polymeric/plastic material) of said seats 20, without any interposition of support/gripping layers. Preferably, the bars 8 have a substantially parallelepiped shape and a substantially square section transverse to the axis B.

In order to increase the clarity of the operating method of the system 1, the use of the spacing members 9 in a first shelf 6 will be described in the following disclosure, given that this operation is the same for the remaining shelves 6 present in the system 1.

The first shelf 6, in the initial step, can be assembled/formed in the following manner: the mechanical spacing members 9 are connected to the bars 8 so that they are each arranged between two adjacent bars 8 and the connection devices 11 are coupled to the opposite distal ends of each bar 8 so as to close them and thus prevent the mechanical spacing members 9 from slipping out of the slots 8a.

Following the completion of the mutual coupling of the mechanical spacing members 9 and the bars 8, the connection devices 11 are then snap-fitted on the frame 7 (on the sides). In this step, two groups of independent bars 8 can be formed in the shelf 6 in which each group of bars 8, when coupled to the frame 7, has the mechanical spacing members 9 in the first operating position (folded) (FIGS. 2 and 5).

The connection devices 11 of the bars 8 of the two groups are then coupled to the supporting frame 7 of the shelf 6 so that the two groups of bars 8 are arranged one beside the other, so that the bars 8 are arranged parallel to the reference axis A and so that the mechanical spacing members 9 are in the first operating position in which the distance between the bars 8 is D1.

Once the first shelf 6 is completed, the sowing step is carried out, during which the seeds are placed in the seats 20.

Following the germination of the plant products, the step of transplanting the plant products from the first shelf into second shelves is performed, for example a pair of second shelves 6. In this step the operator decouples each of the two groups of bars 8 from the supporting frame 7 (decouples the connection devices 11 from the sides of the frame 7) so as to separate them from the first shelf 6, mutually spaces the bars 8 of the group by making the mechanical spacing members 9 spread apart so as to reach the second distance D2 and mechanically couples the connection devices 11 on the supporting frame 7 of the second shelf 6.

Thanks to the opening movement of the mechanical spacing members 9, on the one hand, a space is created in each second shelf around the plant products which allows the continued growth of the same and, on the other hand, a reduction of the density thereof is created.

The advantages of the system described above are as follows: the use of the mechanical spacing members described above makes it possible to simplify the execution of repatching, reduce time and therefore costs and reduce the risk of contamination of plant products.

Finally, it is clear that modifications and variations can be made to the vertical cultivation system and to the method described and illustrated above without thereby departing from the scope of the present invention defined by the attached claims.

The invention claimed is:

1. A system for cultivating plant products without soil comprising a plurality of shelves for cultivating said plant products, each said shelf has a reference axis and comprises:
    a supporting frame,
    a plurality of cultivation bars which have an approximately rectilinear shape, extend along respective longitudinal axes, and are coupled to said supporting frame in order to be arranged approximately coplanar and alongside one another so as to have the respective longitudinal axes parallel to said reference axis,
    mechanical spacing members, which are interleaved between the cultivation bars and are structured so that the actuation of a mechanical spacing member causes a pre-established variation of the distance transverse to said reference axis, between two adjacent cultivation bars adjacent to the actuated mechanical spacing member; said mechanical spacing members are structured so as to be operated between a first operating condition, in which the mechanical spacing member positions the two adjacent cultivation bars at a first pre-established distance one with respect to the other while keeping them mutually parallel, and a second operating condition, in which the mechanical spacing member arranges the two adjacent cultivation bars at a second pre-established distance greater than the first pre-established distance, keeping them parallel to one another;
    said system being characterised in that
    said mechanical spacing members comprise respective rectangular bellows-structured sheets, foldable along a folding line which extends parallel to the longitudinal axis of the bars and is approximately defined by the intersection of the respective rectangular sheet and the centre-line plane thereof.

2. The system according to claim 1, wherein said folding line delimits on said sheet two rectangular side edges which, in the first operating condition, are arranged approximately parallel to the centre-line plane and are facing one another so that the bars, connected to the same, are approximately alongside one another at the first distance.

3. The system according to claim 2, wherein, in said second operating condition, said sheet has said edges spread apart so as to move the two bars, connected to the same, at said second distance, one from the other.

4. The system according to claim 2, wherein the ends of said edges parallel to said folding line are axially engaged in respective slots formed on said bars along a direction parallel to said longitudinal axis.

5. The system according to claim 2, wherein said first distance between two adjacent bars corresponds approximately to the overall thickness of said two edges set vertically alongside one another; and wherein said second distance corresponds approximately to the width of the extended sheet, measured transversely to said folding line.

6. The system according to claim 1, wherein the spacing members of at least one cultivation shelf are coupled to the respective bars so as to form at least two groups of distinct bars separated from one another.

7. The system according to claim 1, wherein said mechanical spacing member is structured to be coupled in a stable yet easily removable manner to the two adjacent cultivation bars.

8. The system according to claim 4, wherein said edges have on the free edges thereof respective enlarged portions which engage axially in said slots so as to slide therein; said slots are shaped to prevent the extraction from the same of the enlarged portion of the edge along a direction transverse to said longitudinal axis.

9. The system according to claim 1, comprising connection devices which are structured so as to couple the opposite distal ends of the bar to said supporting frame.

10. The system according to claim 1, wherein said bars are manufactured with a polymeric-based material, and are provided at the top with seats to house the seeds of said plant products.

11. The system according to claim 1, wherein said mechanical spacing members are manufactured with a polymeric-based material.

12. A shelf for cultivating plant products having a reference axis and comprising:
   a supporting frame,
   a plurality of cultivation bars which have an approximately rectilinear shape, extend along respective longitudinal axes, and are coupled to said supporting frame so as to be arranged approximately coplanar and alongside one another in order to have the respective longitudinal axes parallel to said reference axis,
   mechanical spacing members, which are interleaved between the cultivation bars and are structured so that the actuation of a mechanical spacing member causes at least a pre-established variation of the distance transverse to said reference axis, between two adjacent cultivation bars adjacent to the actuated mechanical spacing member;
   said mechanical spacing members are structured so as to be operated between a first operating condition, in which the mechanical spacing member positions the two adjacent cultivation bars at a first pre-established distance one with respect to the other while keeping them mutually parallel, and a second operating condition, in which the mechanical spacing member arranges the two adjacent cultivation bars at a second pre-established distance greater than the first pre-established distance, keeping them parallel to one another,
   said shelf being characterised in that said mechanical spacing members comprise respective rectangular bellows-structured sheets, foldable along a folding line which extends parallel to the longitudinal axis of the bars and is approximately defined by the intersection of the respective rectangular sheet and the centre-line plane thereof.

13. The shelf according to claim 12 wherein said folding line delimits, on said sheet, two rectangular side edges, which, in the first operating condition, are arranged approximately parallel to the centre-line plane and facing one another so that the bars connected to the same, are approximately alongside one another at the first distance.

14. An operating method for a system for cultivating plant products without soil comprising a plurality of shelves for cultivating said plant products, wherein each said shelf has a reference axis;
   said method comprising:
      prearranging a supporting frame,
      prearranging a plurality of cultivation bars which have an approximately rectilinear shape and extend along respective longitudinal axes,
   interleaving, between said cultivation bars, mechanical spacing members, which are structured so that the actuation of a mechanical spacing member causes a variation of the distance, transverse to said reference axis, between two adjacent cultivation bars adjacent to the same; said mechanical spacing members are structured so as to be operated between a first operating condition, in which the mechanical spacing member positions the two adjacent cultivation bars at a first pre-established distance one with respect to the other while keeping them mutually parallel, and a second operating condition, in which the mechanical spacing member arranges the two adjacent cultivation bars at a second pre-established distance greater than the first pre-established distance, keeping them parallel to one another, said mechanical spacing members comprise respective rectangular bellows-structured sheets, foldable along a folding line which extends parallel to the longitudinal axis of the bars and is approximately defined by the intersection of the respective rectangular sheet and the centre-line plane thereof,
      coupling said bars to said supporting frame so as to arrange them approximately coplanar and alongside one another so as to have the longitudinal axes parallel to said reference axis;
   said method being characterised in that it comprises the step of opening at least one or more of said foldable sheets to move the respective two adjacent cultivation bars connected to the same by moving them away and spacing them apart from one another until reaching, at the end of the opening movement, said second pre-established distance in which said bars are still parallel to one another.

15. The method according to claim 14, comprising the step of transplanting the plant products from a first shelf into at least a pair of second shelves;
   said first shelf comprising two groups of independent bars wherein each group of bars is coupled to a frame of said first shelf by means of connection devices, and has the mechanical spacing members in the first operating condition;

said transplanting step comprising:

decoupling each of the two groups of bars from the respective supporting frame so as to separate them from said first shelf, mutually spacing the bars of the group by making the mechanical spacing members spread apart so as to reach the second distance, and mechanically coupling said connection devices onto the supporting frame of a respective second shelf.

\* \* \* \* \*